United States Patent
Fang et al.

(10) Patent No.: US 7,886,423 B2
(45) Date of Patent: Feb. 15, 2011

(54) SLIDER WITH MICRO-TEXTURE AND METHOD FOR FORMING THE SAME

(75) Inventors: HongXin Fang, Dongguan (CN); HongTao Ma, Dongguan (CN); Yu Ding, Dongguan (CN); Heng Qiao, Dongguan (CN); BaoHua Chen, Dongguan (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 884 days.

(21) Appl. No.: 11/727,059

(22) Filed: Mar. 23, 2007

(65) Prior Publication Data
US 2007/0226988 A1    Oct. 4, 2007

(30) Foreign Application Priority Data
Mar. 29, 2006    (CN) .................. 2006 1 0073327

(51) Int. Cl.
G11B 5/127    (2006.01)
H04R 31/00   (2006.01)

(52) U.S. Cl. .............. 29/603.12; 29/603.07; 29/603.18; 216/13; 216/14; 216/56; 360/235.4; 360/236.4

(58) Field of Classification Search .............. 29/603.12, 29/603.07, 603.15, 603.16, 603.18; 427/460, 427/533, 249.1, 255.23, 295; 360/235.4–235.8, 360/236.4–236.7; 148/97, 239, 240, 280; 451/29; 216/13, 14, 56; 204/192.38, 192.11, 204/192.13, 192.34, 480, 481, 559, 568
See application file for complete search history.

(56) References Cited

U.S. PATENT DOCUMENTS

| | | | | |
|---|---|---|---|---|
| 5,862,013 | A * | 1/1999 | Haga | 360/235.2 |
| 6,001,268 | A * | 12/1999 | Nguyen et al. | 216/67 |
| 6,004,472 | A * | 12/1999 | Dorius et al. | 216/22 |
| 6,086,796 | A * | 7/2000 | Brown et al. | 264/1.33 |
| 2005/0243469 | A1 * | 11/2005 | Chaw et al. | 360/235.1 |
| 2007/0050971 | A1 * | 3/2007 | Ueda et al. | 29/603.07 |

FOREIGN PATENT DOCUMENTS

GB    2166888 A  *  5/1986

OTHER PUBLICATIONS

Nakanishi et al. "Floating Thin Film Head Fabricated by Ion Etching Method" Sep. 1980, IEEE Transactions on Magnetics vol. 16, No. 5, pp. 785-787.*

* cited by examiner

*Primary Examiner*—Derris H Banks
*Assistant Examiner*—Jeffrey Carley
(74) *Attorney, Agent, or Firm*—Nixon & Vanderhye P.C.

(57) ABSTRACT

A method for forming micro-texture on ABS of a slider, includes steps of: positioning sliders arranged in arrays on a tray, each slider having a pole tip facing upward; loading the tray into a processing chamber, and evacuating the processing chamber to a preset pressure; introducing a mixture gas of inert gas and hydrocarbon gas into the processing chamber, and ionizing the mixture gas to produce ion beams; exposing the sliders to the ion beam for etching so as to form micro-texture with two-step structure on the ABS of the slider. The invention also discloses a method of manufacturing a slider having micro-texture.

19 Claims, 9 Drawing Sheets

SLIDER WITH MICRO-TEXTURE AND METHOD FOR FORMING THE SAME

This application claims priority to Chinese Application No. 200610073327.7, filed Mar. 29, 2006, the entire contents of which are hereby incorporated by reference.

FIELD OF THE INVENTION

The present invention relates to a method of manufacturing slider, particularly to a method of forming micro-texture on the air bearing surface (ABS) of the slider, and more particularly to a highly selective slider etching method, by which rough micro-texture can be formed on the ABS of the slider, and an influence on topography of slider pole tip by etching process can be avoided or weakened.

BACKGROUND OF THE INVENTION

One known type of information storage device is disk drive device. In data reading/writing operation, a disk with a magnetic layer in the disk drive rotates at a high speed such that an air bearing is generated between the disk and the slider disposed above the disk; therefore, the slider is dynamically floated above the disk and a certain flying height for the slider is maintained. The data information is written to or read from the magnetic layer via a magnetic read/write element incorporated in the slider.

Presently, this type of hard disk drives (HDDs) are booming with digital devices, such as digital cameras and audio/video devices and even television sets, which require a large amount of storage. Thus, there is a huge market demand for the HDDs, especially for the HDD with high areal density and small physical volume.

High areal density of recording can be accomplished by, either improving magnetic performance of the magnetic coating on the disk surface or reducing the size of the magnetic read/write slider that access data stored in the magnetic coating. Size reduction of the read/write slider results in a weaker read/write signal; accordingly, the magnetic track width and/or the magnetic track pitch are also decreased. However, the key aspects of decreasing the magnetic track width and/or track pitch are to improve the position control of the read/write slider, such as the flying height control, which represents the distance between the disk surface and the read/write slider when the slider is flying above the disk surface. In addition, controls for slider pole tip recession and thickness of protective coating for both the magnetic slider and the disk surface are also key points for achieving the above object.

On the other hand, minimizing the physical volume of the HDD is a systematic engineering, which concerns not only changes in the component physical dimension of the HDD, but also re-optimization of flying dynamics performance of the slider. Currently, the size of HDD for desktop computer is 3.5 inches, and the size of HDD for notebook computer is 2.5 inch. For applications in portable digital audio/video device, the size of the HDDs is down to 1 inch or even 0.85 inch.

As is known to all, slider is an important component of the HDD. FIG. 1a shows a typical slider used in HDD, which is viewed from ABS (a surface of the slider facing to a disk) of the slider. As illustrated, the slider 10 comprises an ABS 18, a leading edge 15 and a trailing edge 13 opposite to the leading edge 15. A pole tip 11 is provided on the trailing edge 13, the pole tip 11 has read/write elements for achieving data read/write operation. A shallow etched area 12 is provided adjacent to the leading edge 15 for controlling airflow entering into the ABS.

FIG. 1b shows an enlarged view of the pole tip of FIG. 1a, and FIG. 1c shows a partial, sectional view of the pole tip shown in FIG. 1a along A-A line thereof. As illustrated, the pole tip 11 has a laminated structure, which comprises from top to bottom a first shielding layer 113, a second shielding layer 111, a first inductive write head pole 118 and a second inductive write head pole 116 spacing away from the first inductive write head pole 118. All above components are carried on a substrate 122 of the slider. A magneto-resistive element 112 and a lead layer 114 disposed at two sides of the magneto-resistive element 112 and electrically connected to the magneto-resistive element 112 are provided between the second shielding layer 111 and the first shielding layer 113. A coil 117 is positioned between the first inductive write head pole 118 and second inductive write head pole 116 for realizing writing operation.

The slider has a very flat surface in its pole tip region. The surface is formed usually by lapping the substrate of the slider. The very flat surface of the slider has a roughness (Ra) of less than 0.3 nm. The lapping process may also provide assistance in controlling pole tip recess.

For small-sized HDD, which is often referred to as a micro disk drive, its slider substrate is required to have a very high surface roughness, namely, it is necessary to form micro-texture on a surface (ABS) of the slider for improving take-off and touch-down performance thereof. Since the rougher the slider substrate is, the more notable the microcosmic concave and convex structure of the slider surface topography is. This means more air will be contained in the concave-convex structure, therefore, when the slider takes off from or touches down to the disk surface, physical friction of the slider and/or disk surface will be reduced, and thus decreasing abrasion of the slider and/or disk, accordingly greatly lengthening lifespan of the slider and/or disk. The micro-texture is conventionally formed on ABS of the slider by etching substrate of the slider using etching means. The slider substrate is generally made of AlTiC, which is a mixture of alumina ($Al_2O_3$) and titanium carbide (TiC). In etching process, as $Al_2O_3$ is etched more rapidly than TiC, so island-like TiC grains embedded in $Al_2O_3$ base body will be formed on the ABS. FIGS. 2a-2b illustrate this so-formed microstructure due to difference in etching speed. FIG. 2a illustrates a phase image of the microstructure, in which white region designated by numeral 120 represents extruded island-like TiC grains, while black region designated by numeral 119 represents $Al_2O_3$ base body. FIG. 2b shows a cross-sectional view of the microstructure. As illustrated, it is the interlaced island-like TiC grains 120 and $Al_2O_3$ base body 119 to form the micro-texture of the ABS.

Conventional etching method for forming micro-texture on ABS of the slider generally uses a pure gas such as Argon, or oxygen ($O_2$), or a mixture gas of Argon and oxygen as its processing gas during etching process. By ionizing the processing gas to generate ion beams of high energy for continuously bombarding the slider surface so as to make atoms on the slider surface escape therefrom, i.e. an etching action happens on the slider surface. The ion bombarding is also referred as to ion beam milling. During etching process, almost no chemical reaction happens between the ion beams and material of the slider surface, but only momentum transfer happens. Though this conventional etching means is able to form micro-texture on ABS of the slider, it is very difficult for thus formed micro-texture to obtain a roughness that meets the demand of micro-disk drives, because this ion etching is mainly a physical reaction, and in this physical etching process, the above ionized processing gas (Argon or oxygen) renders little speed difference in etching $Al_2O_3$ and TiC. That is, etching ratio of $Al_2O_3$/TiC is very smaller. The etching ratio keeps very small and cannot meet the requirement even when an etching process is performed by ion beam with a glancing incidence angle.

In case where high etching ratio cannot be obtained by conventional etching method, to obtain a rougher micro-texture, a method commonly used in the field is by increasing etching volume. That is, the height difference between the $Al_2O_3$ base body and the island-like TiC grains are increased by extending etching time. FIGS. 4a-4b show the etching process. FIG. 4a shows a slider substrate 122 after it is lapped but before it is etched, in which lapped slider surface 123 is taken as a datum surface for measuring etching height, and distance between the pole tip 11 and the datum surface 123 is d1. FIG. 4b shows a state after the slider substrate is etched, in which numeral 124 represents micro-texture formed by etching process, d2 represents distance between the etched pole tip 11 and the datum surface 123, a difference between d1 and d2 represents etched height of the pole tip, while D1 represents etched height of the slider substrate beyond the pole tip. It is obtained from measurement that difference between d1 and d2 is larger than D1; that is, the pole tip is etched by the ion beams more seriously than other region.

The big volume of etching has bad influences on the pole tip. Firstly, big volume of etching may readily cause damage to the pole tip, especially damage to magnetic domain of the pole tip, thus effecting electromagnetic characteristic of the slider; secondly, the pole tip is made of many kinds of materials such as materials for constructing the inductive write head pole, shielding layers, magneto-resistive (MR) element, leads and hard magnetic bias. These materials have different etching rates due to different material nature of themselves. Big volume of etching in the pole tip region produces an undulated surface, therefore, not only original topography of the pole tip is destructed, but also performance of the slider is degraded to some extent. In addition, reliability of the diamond-like carbon layer (DLC) formed on the surface of the pole tip in latter process is decreased, or instead, a thickness of the DLC layer must be increased for deleting the influence of surface unevenness; however, increment in thickness of the DLC layer will make a distance between the MR sensor and the magnetic layer of the disk increased, and this will weaken read/write signals of the slider.

Thus, there is a need for an improved method that does not suffer from the above-mentioned drawbacks.

SUMMARY OF THE INVENTION

One aspect of the present invention is to provide a method for forming micro-texture on the air bearing surface of a slider, by which rough micro-texture can be formed rapidly and the pole tip of the slider can be protected from being damaged during micro-texture forming process.

Another aspect of the present invention is to provide a method for forming a slider having micro-texture, by which rough micro-texture can be formed rapidly and the pole tip of the slider can be protected from being damaged during micro-texture forming process.

To achieve above objects, a method for forming micro-texture on the air bearing surface of a slider comprises steps of: (1) positioning sliders arranged in arrays on a tray, each slider having a pole tip facing upward; (2) loading the tray into a processing chamber, which is then evacuated to a preset pressure; (3) introducing a mixture gas of inert gas and hydrocarbon gas into the processing chamber and ionizing the mixture gas to form ion beams; (4) and exposing the sliders to the ion beams and forming micro-texture of two-step structure on the air bearing surface of the slider by ion beam etching.

The inert gas is Argon, Neon, Krypton or Xenon. The hydrocarbon gas is $CH_4$, $C_2H_4$, $C_2H_2$ or benzenoid gas.

In one embodiment of the invention, the mixture gas contains Argon and $C_2H_4$, and the content of the $C_2H_4$ is 10 percent.

In another embodiment of the invention, the mixture gas contains Argon and $C_2H_4$, and the content of the $C_2H_4$ is 20 percent.

In another embodiment of the invention, the mixture gas contains Argon and $C_2H_4$, and the content of the $C_2H_4$ is 40 percent.

Preferably, the mixture gas may also contain dilution gas for slowing etching speed so as to avoid excessive etching.

In one embodiment of the invention, the method further comprises a step of shielding the pole tip of the slider with a photo-resist before the step (3). The photo-resist is a positive photo-resist or a negative photo-resist. The photo-resist has a thickness in a range of 1-20 microns.

In one embodiment of the invention, the step has a height ranging from 10 angstroms to 50 angstroms and the distance between adjacent steps ranges from 0.2 microns to 3 microns.

In one embodiment of the invention, the ion beams have a flow speed of 30 sccm (standard cubic centimeters per minute), an energy of 300 eV, a current of 250 mA, an incidence angle of 65 degrees and an etching time of 20-200 seconds.

The invention also provides a method for forming a slider having micro-texture, which comprises the following steps: positioning sliders arranged in arrays on a tray, each slider having a pole tip facing upward; loading the tray into a processing chamber, which is then evacuated to a preset pressure; introducing a mixture gas of inert gas and hydrocarbon gas into the processing chamber and ionizing the mixture gas to form ion beams; exposing the sliders to the ion beams and forming micro-texture of two-step structure on the air bearing surface of the slider by ion beam etching; forming a silicon coating on the surface having the micro-texture; and forming a diamond-like carbon layer on the silicon coating.

The invention takes a mixture gas containing proper contents of inert gas and hydrocarbon gas as the processing gas in etching process. The mixture processing gas can be ionized and changed to mixture ion beams. The mixture ion beams have clearly different etching rates while etching different materials, therefore, bigger etching selectivity of $Al_2O_3$/TiC is obtained, and micro-texture meeting requirements of the micro-disk drive can be formed without increasing etching volume. In addition, since the etching volume is small, etching has little influence on the pole tip; as a result, original topography of the pole tip can be maintained, thereby preventing the pole tip from being damaged during etching process.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b shows an enlarged structural view of a pole tip of the slider shown in FIG. 1a;

FIG. 2b shows a cross-sectional view of the micro-texture shown in FIG. 2a;

DETAILED DESCRIPTION OF ILLUSTRATED EMBODIMENTS

Various preferred embodiments of the instant invention will now be described with reference to the figures. As illustrated, the invention provides a method for forming micro-texture on the air bearing surface of a slider, in which a mixture gas of proper contents of inert gas and hydrocarbon gas is taken as a processing gas during etching process, and the mixture gas is ionized and changed to mixture ion beams. The etching process using the mixture ion beams includes carbon or polymer deposition, as well as chemical etching of hydrogen. The carbon or polymer deposition makes the whole etching rate slow, while the chemical etching of hydrogen speeds up the etching rate of $Al_2O_3$, but has no effect on etching rate of the TiC. In addition, when the mixture ion beams etch $Al_2O_3$, oxygen radicals or oxygenic ions are generated. Compared to $Al_2O_3$, TiC has more carbon or polymer deposited thereon, therefore, etching of TiC is lowered to some extent. Accordingly, a bigger etching selectivity of $Al_2O_3$/TiC can be achieved and micro-texture meeting demands of the micro-disk drive can be formed without increasing etching volume. In addition, since etching volume is small, etching has little influence on the pole tip; as a result, original topography of the pole tip can be maintained, thereby preventing the pole tip from being damaged by etching process.

Figure 1A:
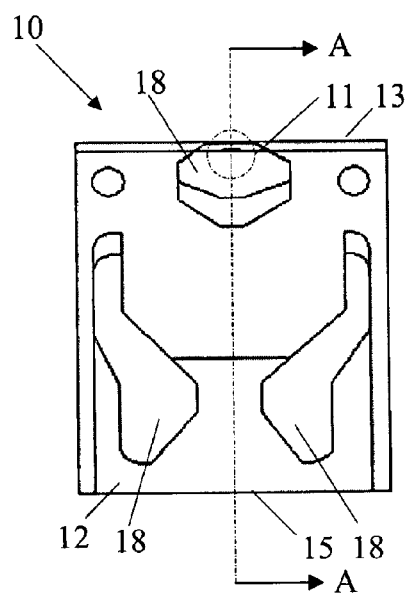
FIG. 1a shows a slider of the related field, viewed from air bearing surface of the slider.
Figure 1B:
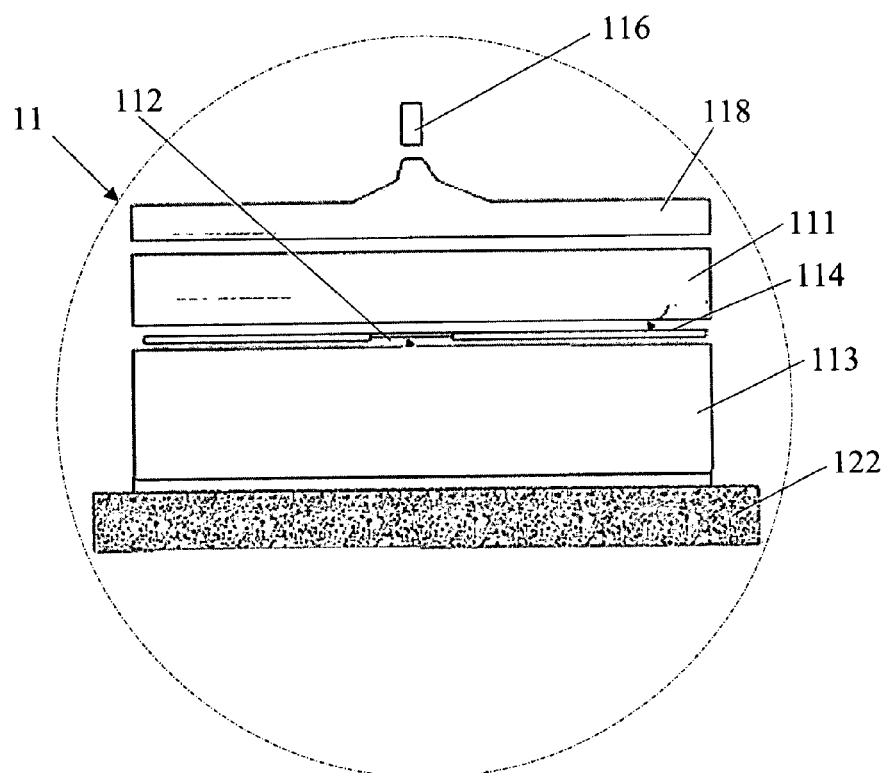
Figure 1C:
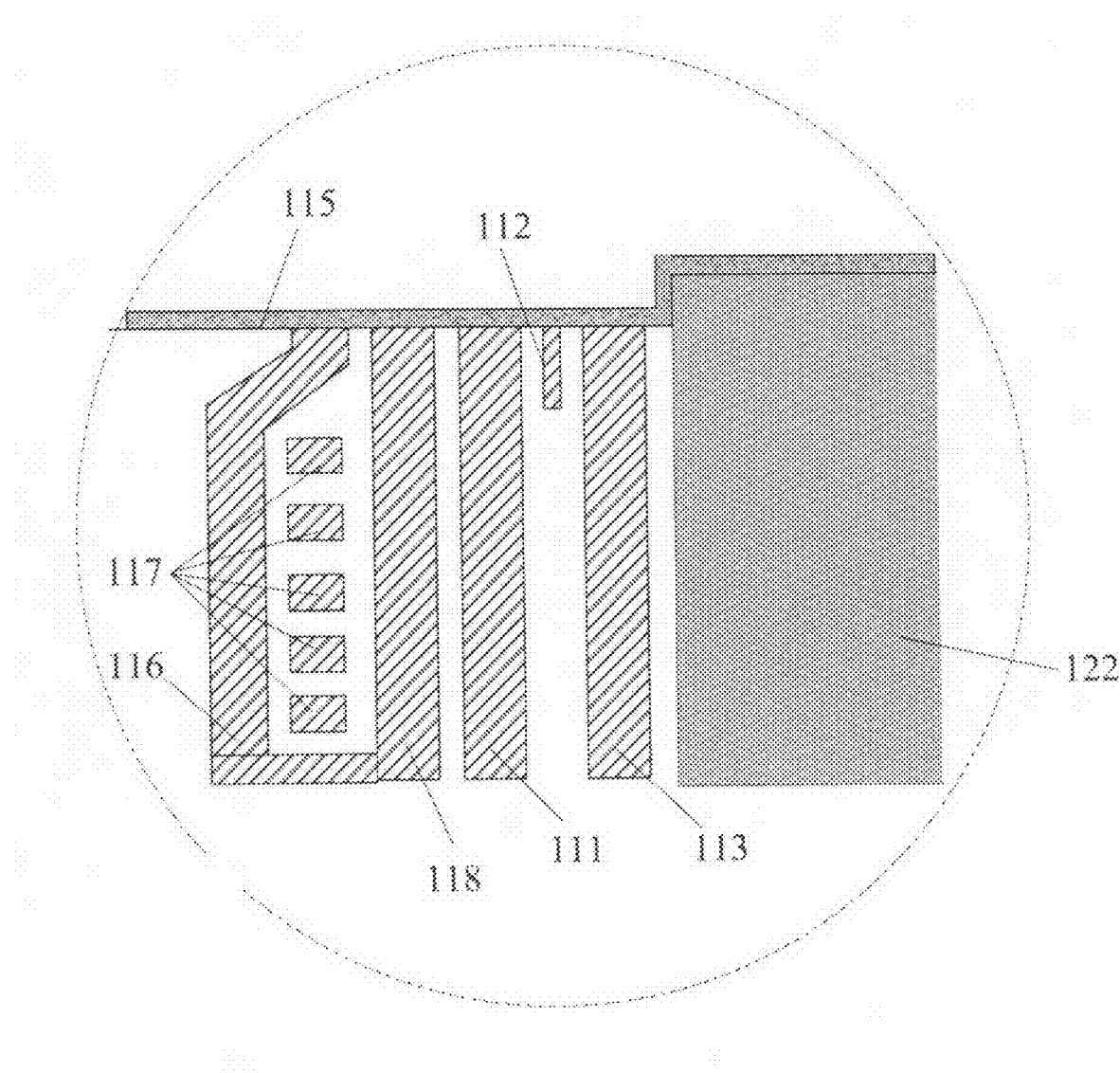
FIG. 1c shows a partial, cross-sectional view of the pole tip shown in FIG. 1a along A-A line thereof.
Figure 2A:
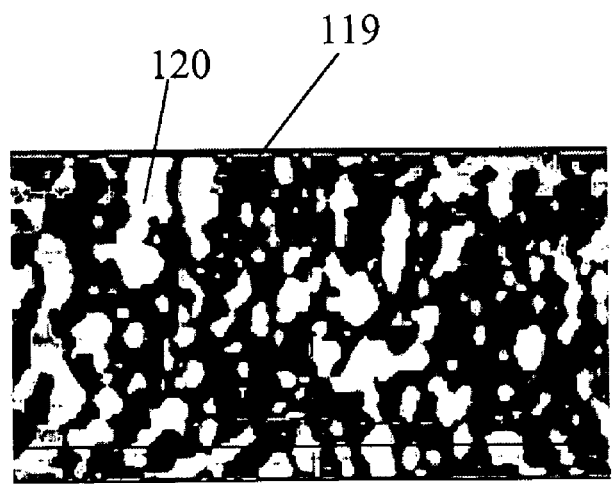
FIG. 2a shows a phase image of micro-texture formed on the air bearing surface of a conventional slider.
Figure 2B:
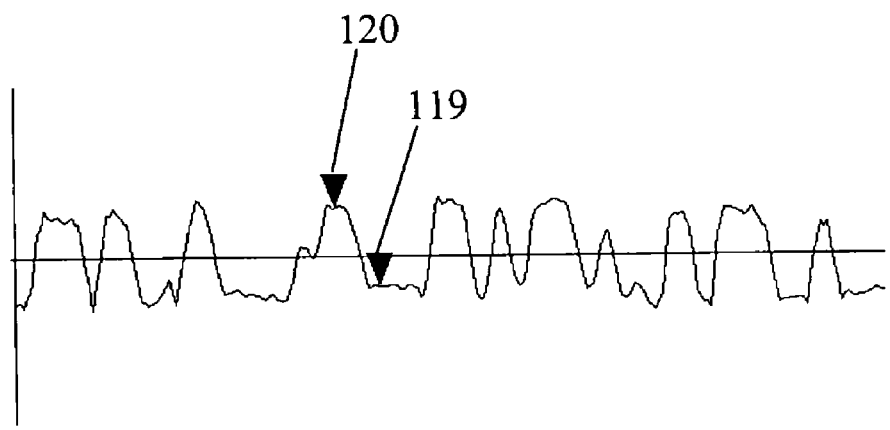
Figure 3:
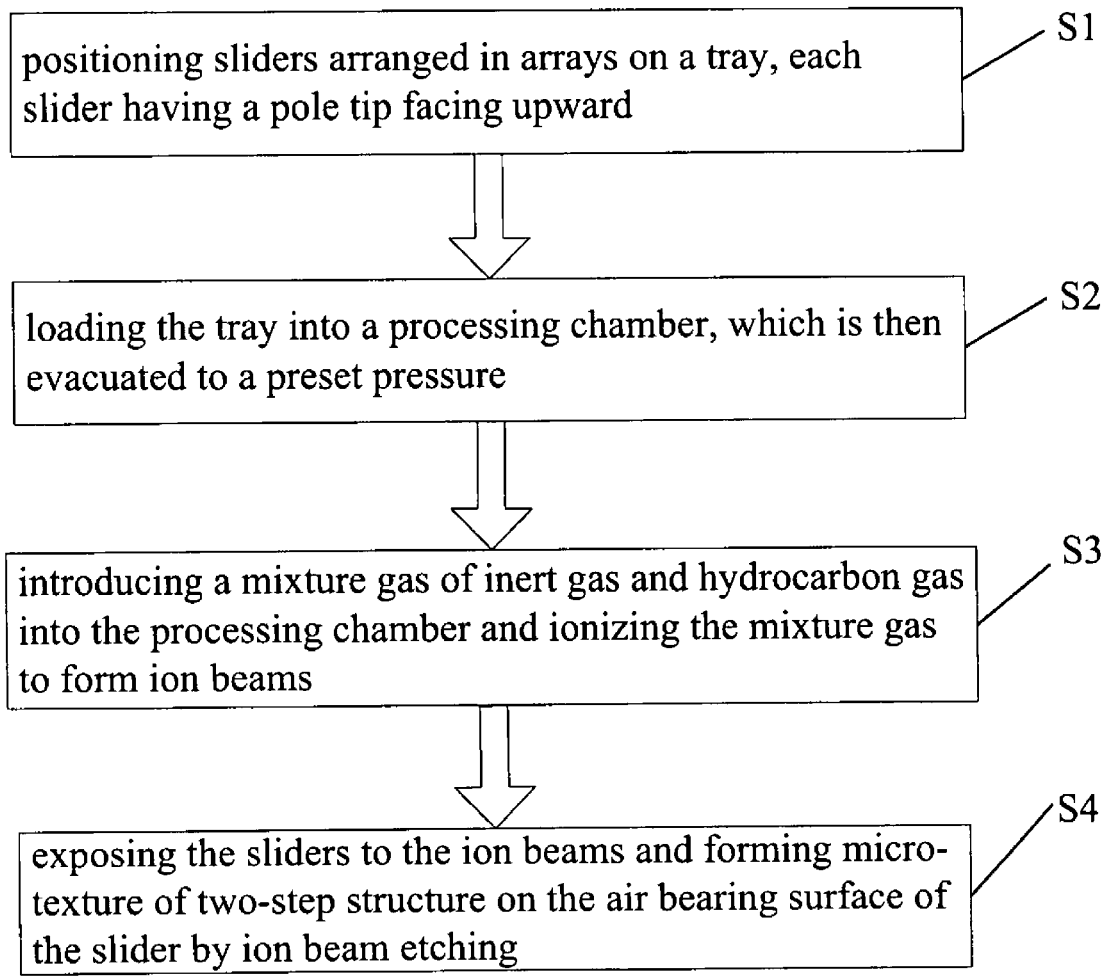
FIG. 3 shows a flowchart of forming micro-texture on the air bearing surface of a slider according to one embodiment of the invention.

FIG. 3 shows a flowchart of forming micro-texture on the ABS of a slider according to one embodiment of the invention. As illustrated, firstly, position sliders arranged in arrays on a tray, each slider having a pole tip facing upward (step S1); then, load the tray into a processing chamber, which is then evacuated to a preset pressure (step S2); introduce a mixture gas of inert gas and hydrocarbon gas into the processing chamber and ionize the mixture gas to form ion beams (step S3); expose the sliders to the ion beams and form micro-texture of two-step structure on the air bearing surface of the slider by ion beam etching (step S4).

The invention takes a mixture gas of inert gas and hydrocarbon gas as a processing gas for etching. Compared to conventional method in which a pure inert gas is used principally as a processing gas, the method of the invention has obvious advantages, that is, the invention can achieve higher etching selectivity, therefore, rougher micro-texture can be formed on air bearing surface of the slider without increasing etching volume. More particularly, AlTiC material that forms the slider substrate is a compound of $Al_2O_3$ and TiC; etching method of the invention etches $Al_2O_3$ much quickly than TiC, and etching rates of the two are different greatly from each other, therefore, micro-texture of clear two-step (constructed by $Al_2O_3$ base body and extruded TiC) can be formed on the air bearing surface of the slider. The difference in etching selectivity between method of the invention and prior art is described in conjunction with FIGS. 5a-5e and FIG. 6.

Figure 5A:
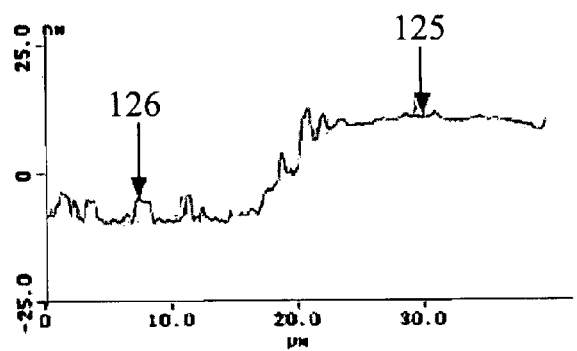
FIG. 5a shows a cross-sectional view of an etched region obtained by an atomic force microscope after the ABS of the slider is etched using a conventional method in which Argon is used as a processing gas.
Figure 5B:
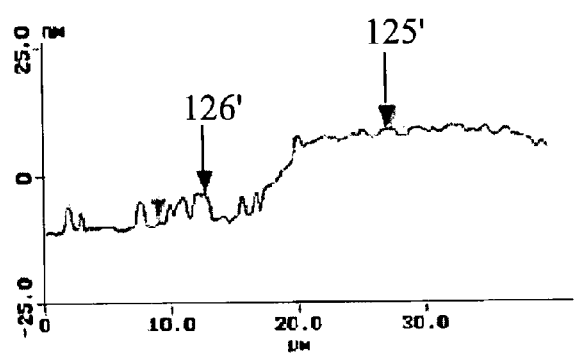
FIG. 5b shows a cross-sectional view of an etched region obtained by an atomic force microscope after the air bearing surface of the slider is etched using conventional method in which Neon is used as a processing gas.
Figure 5C:
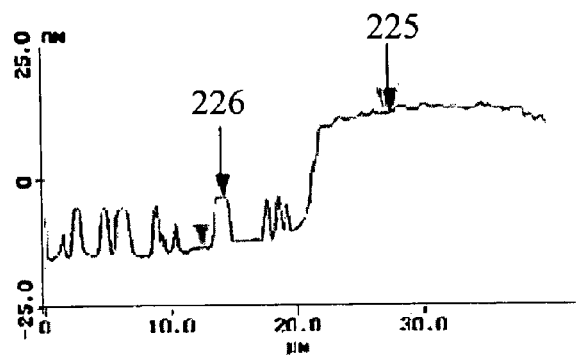
FIG. 5c shows a cross-sectional view of an etched region obtained by an atomic force microscope after the air bearing surface of the slider is etched using method of the invention in which a mixture gas of Argon and $C_2H_4$, in which the content of the $C_2H_4$ is 10 percent, is used as a processing gas.
Figure 5D:
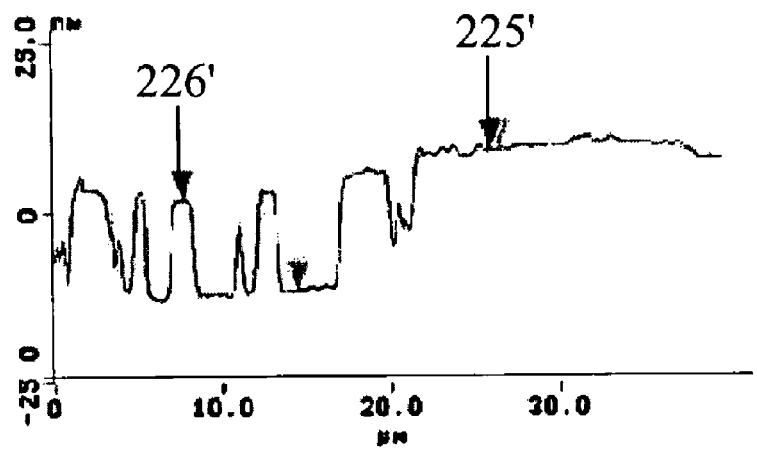
FIG. 5d shows a cross-sectional view of an etched region obtained by an atomic force microscope after the ABS of the slider is etched using method of the invention in which a mixture gas of Argon and $C_2H_4$, in which the content of the $C_2H_4$ is 20 percent, is used as a processing gas.
Figure 5E:
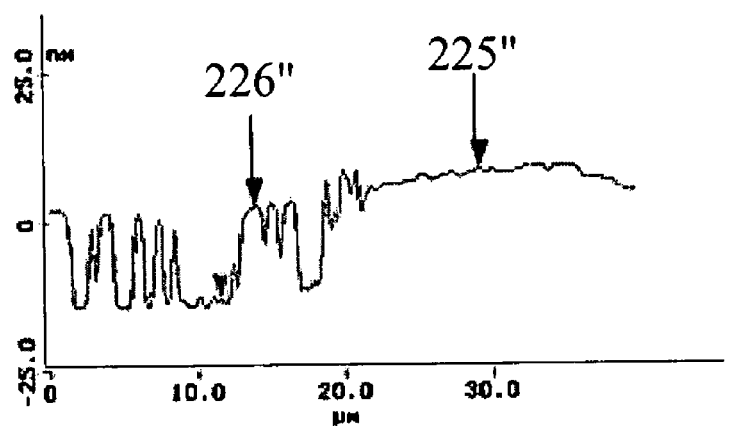
FIG. 5e shows a cross-sectional view of an etched region obtained by an atomic force microscope after the air bearing surface of the slider is etched using method of the invention in which a mixture gas of Argon and $C_2H_4$, in which the content of the $C_2H_4$ is 40 percent, is used as a processing gas.

FIGS. 5a-5b respectively show cross-sectional views of an etched region after the air bearing surface of the slider is etched using conventional method in which Argon or Neon is used as a processing gas; and FIGS. 5c-5e respectively show cross-sectional views of an etched region after the air bearing surface of the slider is etched using method of the invention in which a mixture gas of Argon and $C_2H_4$, in which the content of $C_2H_4$ is 10 percent, 20 percent, 40 percent respectively, is used as a processing gas. It should be noted that the above objects to be etched are row bars constructed by a plurality of sliders, and these row bars are taken as testing samples. Half region of the row bar (region designated by numeral 125, 125', 225, 225' and 225" in FIGS. 5a-5e) is covered by a protect film of photo-resist. The region covered by the photo-resist is protected from being etched and thus can be taken as a reference plane to determine absolute etching height of the other region. The region of the row bar not protected by the photo-resist (region designated by numeral 126, 126', 226, 226' and 226" in FIGS. 5a-5e) is the etching region on which micro-texture is formed. The height of the micro-texture can be obtained using an atomic force microscope, and an area of 40 μm×40 μm (half of etched region and half of protected region) is taken as scanning region; moreover, influence caused by cantilever bow of the atomic force microscope is eliminated by a flatten method. Furthermore, the above etching processes have the same etching condition, that is, the ion beams have a flow speed of 30 sccm (standard cubic centimeter), an energy of 300 eV, a current of 250 mA, an incidence angle of 65 degrees and an etching time of 200 seconds.

It is clear from FIGS. 5*a*-5*e* that deeper micro-texture can be formed by using Neon than that by using Argon. But when Argon and proper content of $C_2H_4$ is used as a processing gas, even rougher micro-texture can be formed, and with the content of the $C_2H_4$ increasing, the micro-texture etched can become rougher and rougher. The following diagram shows etching heights of the micro-texture formed in above etching processes and measured by atomic force microscope. It should be noted that the etching height data of the diagram is obtained by normal distributing a great number of data points of the tested area.

| [unit£ nm] | TiC | Al2O3 | selectivity |
|---|---|---|---|
| Argon | 16.2 | 19.8 | 1.23 |
| Neon | 13.3 | 18.2 | 1.36 |
| Argon + C2H4(10%) | 16.8 | 25.3 | 1.51 |
| Argon + C2H4(20%) | 7.7 | 22.4 | 2.93 |
| Argon + C2H4(40%) | 2.7 | 17.6 | 6.45 |

It is clear from the diagram that the method of the invention can obtain high etching selectivity of $Al_2O_3$/TiC, and the etching selectivity becomes bigger when more content of $C_2H_4$ is contained in the mixture processing gas.

Figure 6:
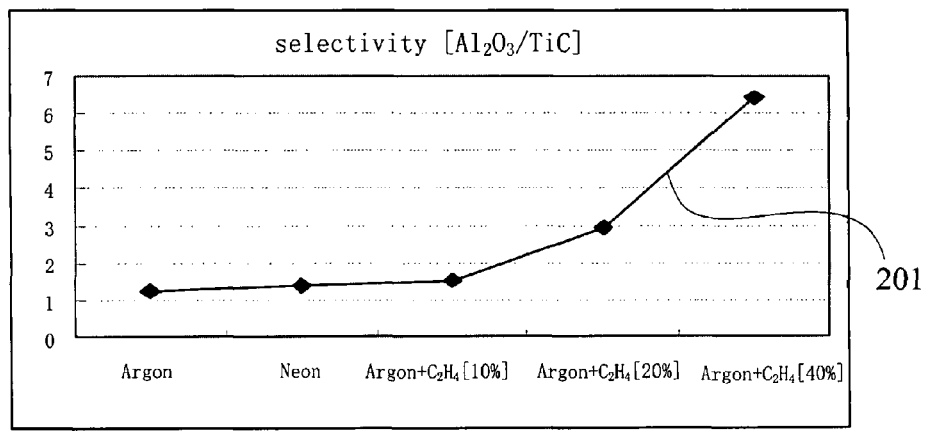
FIG. 6 shows data curves of etching selectivity of $Al_2O_3$/TiC when different gases are taken as a processing gas in the etching process.

FIG. 6 shows data curves of etching selectivity of $Al_2O_3$/TiC based on selectivity data of the above diagram. It is clear from the curve 201 that the etching selectivity of $Al_2O_3$/TiC greatly rises when more content of $C_2H_4$ is contained in the mixture processing gas of the invention.

The etching process of the invention using a mixture gas of Argon and suitable content of $C_2H_4$ as a processing gas may be divided into several aspects. One aspect relates to carbon or polymer deposition, and another aspect relates to chemical etching of hydrogen. The carbon or polymer deposition makes the whole etching rate slow, while the chemical etching of hydrogen speeds up the etching rate of $Al_2O_3$, but has no effect on etching rate of the TiC. In addition, when the mixture ion beams etch $Al_2O_3$, oxygen radicals or oxygenic ions are generated, which makes TiC (compared to $Al_2O_3$) has more carbon or polymer deposited thereon; therefore, and etching of TiC is lowered to some extent. Accordingly, bigger etching selectivity of $Al_2O_3$/TiC can be achieved. In addition, since etching volume is small, etching has little influence on the pole tip, and especially, has even extremely little effect on the MR element. Now, this influence on the MR element caused by the etching method of the invention is described.

Figure 7:
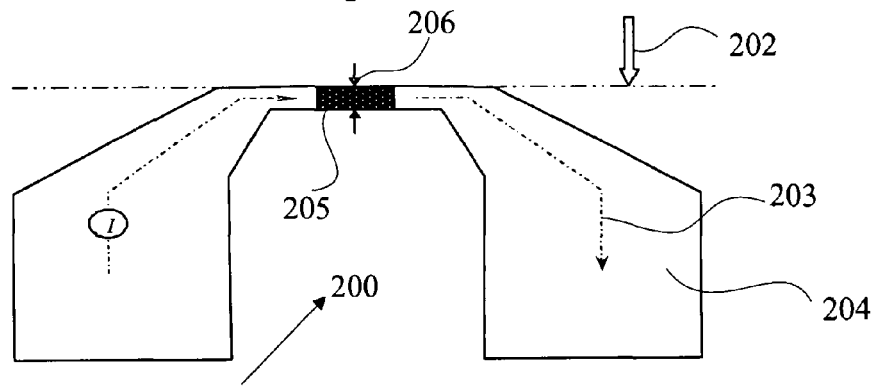
FIG. 7 shows a structure of a MR element of a slider for helpfully illustrating the relation between etching height and resistance change of the MR element.

As shown in FIG. 7, a typical MR element 200 comprises two lead layers 204 and a MR sensor 205 disposed between the two lead layers 204 and electrically connected to the two lead layers 204. The MR element 200 also comprises a hard magnetic bias layer (not shown) under the lead layers 204. As shown in FIG. 7, numeral 202 represents etching direction, while numeral 206 represents thickness of the MR sensor 205. In etching process, the thickness and width of the MR sensor 205 keep unchanged, only the height thereof decreases gradually due to etching action. Height decrease causes resistance increment of the MR sensor 205. Since the resistance of the MR element 200 is decided mainly by the resistance of the MR sensor 205, thus, the resistance change of the MR element 200 obtained by measurement will mostly reflects the resistance change of the MR sensor 205. Here a ratio of micro-texture height to resistance change of the MR sensor MT/MR (selectivity) is quoted to reflect destructive influence on the MR element caused by the etching process. The resistance change of the MR sensor reflects etching height change thereof, and it can be obtained by analysis that the resistance change is proportional to etching height change.

Figure 8:
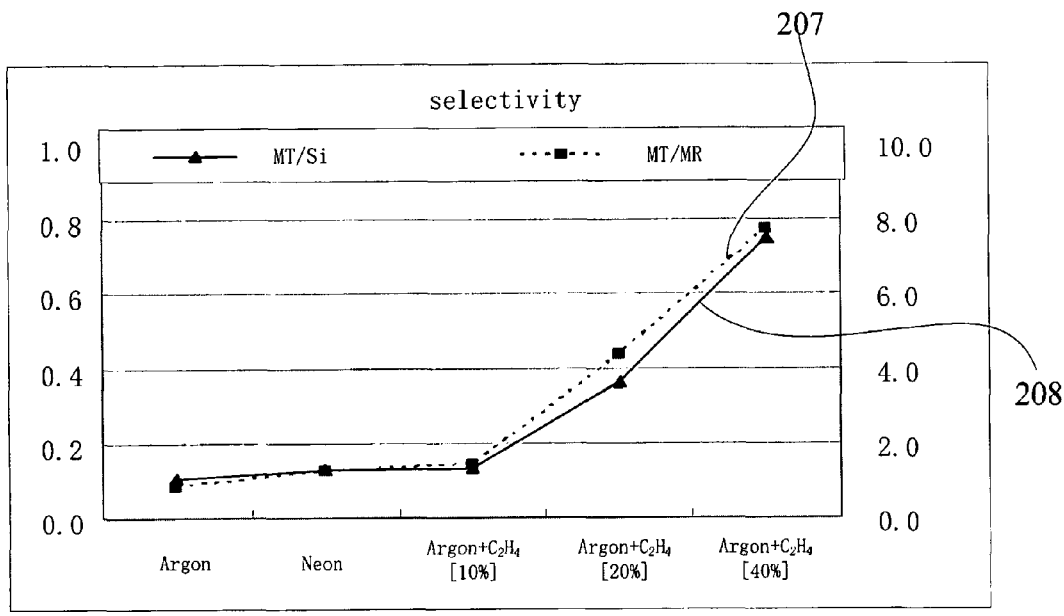
FIG. 8 shows curves of selectivity of micro-texture height to resistance increment of the MR element when different gases are used as a processing gas during the etching process.

FIG. 8 shows curves of selectivity of micro-texture height to resistance increment of the MR element when different gases are used as a processing gas during etching process. In the figure, curve 207 reflecting changes of MT/MR is similar to curve 208 that reflects changes of MT/Si, wherein Si represents etching depth of a Si crystal chip that is placed together with the row bar being tested to receive etching using difference gases. It is clear from the figure that higher selectivity of MT/MR can be realized when a mixture gas of Argon and $C_2H_4$ of the invention is used as a processing gas, and furthermore, the selectivity increases with the increase of $C_2H_4$. The bigger the selectivity is, the smaller the destruction caused by etching process to the MR element is, and the more easily the MR element will keep its original topography and nature. Additionally, MT value (height of the micro-texture) of the selectivity of MT/MR can be seemed as a conjunct result of physical and chemical etching process, while MR value (resistance change of the MR sensor) or Si value (etching depth of the Si crystal chip) thereof can be seemed as a result of only physical etching process.

In addition, the etching selectivity may also be changed by adjusting energy of the ion beams. The energy of the ion beams have great influence on physical etching, but have little influence on chemical etching. Consequently, in case that the content of $C_2H_4$ in the processing gas keeps constant, higher etching selectivity can be achieved by reducing energy of the ion beams. Understandably, a same selectivity in which $Al_2O_3$ and TiC have the same etching rate can be obtained by reducing energy of the ion beams and the content of $C_2H_4$ simultaneously.

Figure 4A:
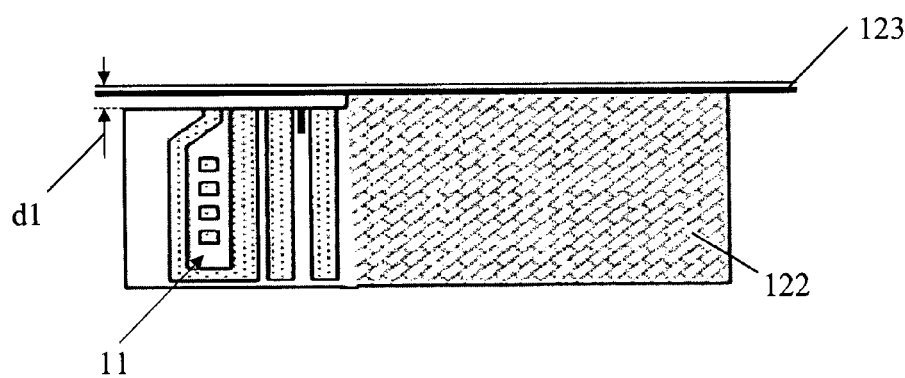
FIG. 4a shows a state of a conventional slider after it is lapped and before it is etched to form micro-texture thereon.
Figure 4B:
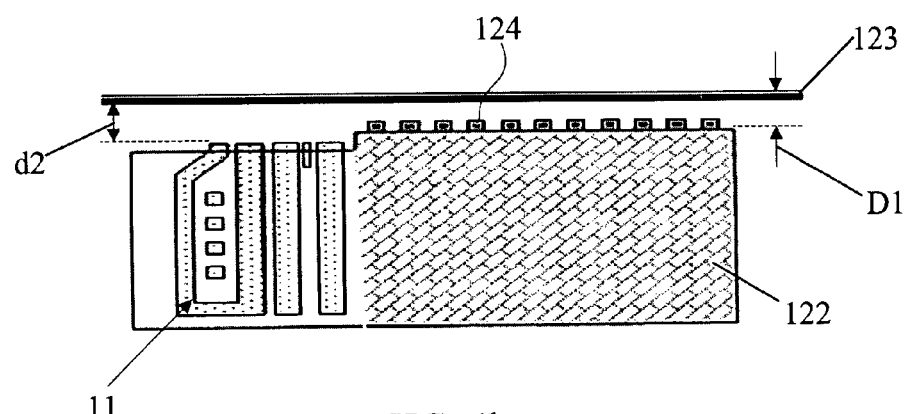
FIG. 4b show a state of the slider of FIG. 4a after it is etched using conventional micro-texture forming method.
Figure 4C:
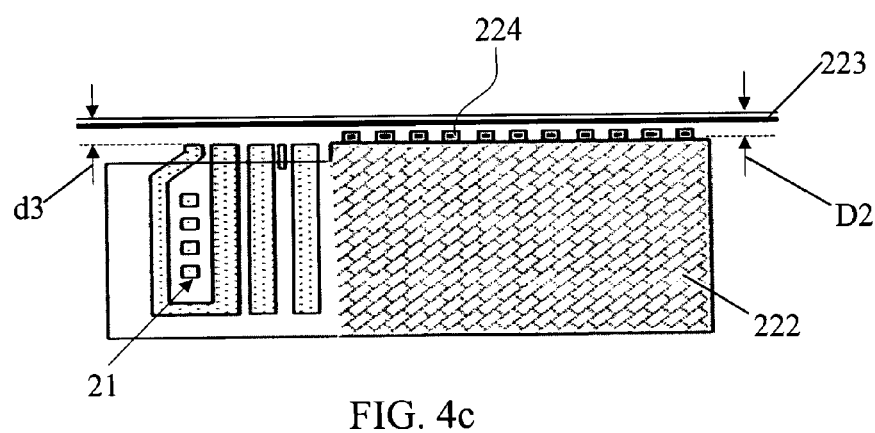
FIG. 4c show a state of the slider of FIG. 4a after it is etched using micro-texture forming method of the invention.

FIG. 4*c* shows a slider having micro-texture after the slider of FIG. 4*a* is etched using method of the invention. FIG. 4*a* shows a lapped slider substrate 122 before it is etched, in which lapped slider surface 123 is taken as a datum surface for measuring etching height, and distance between the pole tip 11 and datum surface 123 is d1. In FIG. 4*b*, numeral 224 represents micro-texture formed by etching process, d3 represents distance between etched pole tip 11 and the datum surface 223, difference between d1 and d3 represents etched height of the pole tip, while D2 represents etched height of the slider substrate beyond the pole tip. It is obtained by measurement that the etching height of the pole tip and slider substrate beyond the pole tip is very smaller than that formed by conventional method.

Understandably, the inert gas may be Argon, Neon, Krypton or Xenon. The hydrocarbon gas may be $CH_4$, $C_2H_4$, $C_2H_2$ or benzenoid gas.

In one embodiment of the invention, the mixture gas contains Argon and $C_2H_4$, and the content of the $C_2H_4$ is 10 percent.

In another embodiment of the invention, the mixture gas contains Argon and $C_2H_4$, and the content of the $C_2H_4$ is 20 percent.

In another embodiment of the invention, the mixture gas contains Argon and $C_2H_4$, and the content of the $C_2H_4$ is 40 percent.

Preferably, the mixture gas may also contains dilution gas. When the etching process is going to end, the dilution gas makes the etching speed slow down to avoid excessive etching.

In one embodiment of the invention, the method further comprises a step of shielding the pole tip of the slider with a photo-resist before the step S3. The photo-resist covers the pole tip, and in micro-texture forming process, the photo-resist prevents the pole tip from being etched unduly by the ion beams. The photo-resist may be a positive photo-resist or a negative photo-resist. Moreover, it is proved by experiment that when the photo-resist has a thickness in a range of 1-20 microns, the photo-resist is able to achieve its protection effect.

In one embodiment of the invention, the step has a height ranging from 10 to 50 angstroms and the distance between adjacent steps ranges from 0.2 to 3 microns.

In one embodiment of the invention, the ion beam has the following parameter: a flow speed of 30 sccm (standard cubic centimeters per minute), an energy of 300 eV, a current of 250 mA, and an incidence angle of 65 degrees; the time for exposing the sliders for ion beams etching is in a range of 20-200 seconds.

Figure 9:
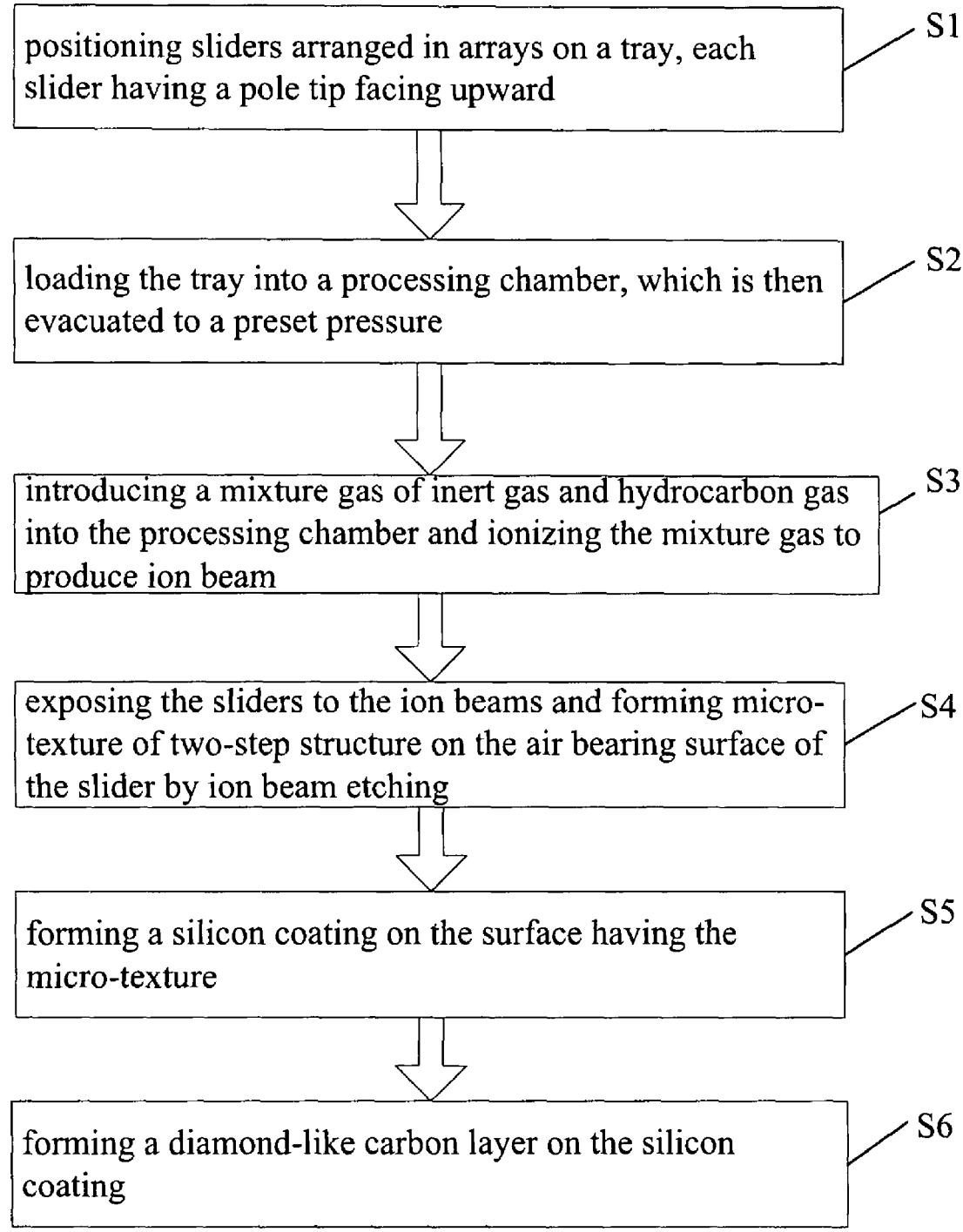
FIG. 9 shows a flowchart of forming a slider having micro-texture according to one embodiment of the invention.

FIG. 9 shows a flowchart of forming a slider having micro-texture according to one embodiment of the invention. Firstly, position sliders arranged in arrays on a tray, each slider having a pole tip facing upward (step S1); then, load the tray into a processing chamber, which is then evacuated to a preset pressure (step S2); after that, introduce a mixture gas of inert gas and hydrocarbon gas into the processing chamber and ionize the mixture gas to form ion beams (step S3); next, expose the sliders to the ion beams and form micro-texture of two-step structure on the ABS of the slider by ion beam etching (step S4); form a silicon coating on the surface having the micro-texture (step S5); finally form a diamond-like carbon layer on the silicon coating (step S6).

The inert gas is Argon, Neon, Krypton or Xenon. The hydrocarbon gas is $CH_4$, $C_2H_4$, $C_2H_2$ or benzenoid gas.

In one embodiment of the invention, the mixture gas contains Argon and $C_2H_4$, and the content of the $C_2H_4$ is 10 percent.

In another embodiment of the invention, the mixture gas contains Argon and $C_2H_4$, and the content of the $C_2H_4$ is 20 percent.

In another embodiment of the invention, the mixture gas contains Argon and $C_2H_4$, and the content of the $C_2H_4$ is 40 percent.

In one embodiment of the invention, the ion beam has a flow speed of 30 sccm (standard cubic centimeter), an energy of 300 eV, a current of 250 mA, an incidence angle of 65 degrees and an etching time of 20-200 seconds.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for forming micro-texture on air bearing surface of a slider, the method comprising:

positioning sliders arranged in arrays on a tray, each slider having a pole tip facing upward;

loading the tray into a processing chamber, and evacuating the processing chamber to a preset pressure;

introducing a mixture gas of inert gas and hydrocarbon gas into the processing chamber, and ionizing the mixture gas to form ion beams, wherein the mixture gas contains Argon and ethylene, and the content of the ethylene is at least 10 percent;

exposing the sliders to the ion beams for etching so as to form micro-texture with two-step structure on the air bearing surface of the sliders.

2. The method as claimed in claim 1, wherein the content of the ethylene is 20 percent.

3. The method as claimed in claim 1, wherein the content of the ethylene is 40 percent.

4. The method as claimed in claim 1, wherein the mixture gas further contains dilution gas for slowing etching speed to avoid excessive etching.

5. The method as claimed in claim 1, further comprising a step of shielding the pole tip of the slider with a photo-resist before introducing the mixture gas of inert gas and hydrocarbon gas into the processing chamber, and ionizing the mixture gas to form ion beams.

6. The method as claimed in claim 5, wherein the photo-resist is a positive photo-resist or a negative photo-resist.

7. The method as claimed in claim 5, wherein the photo-resist has a thickness ranging from 1 micron to 20 microns.

8. The method as claimed in claim 1, wherein the step has a height ranging from 10 angstroms to 50 angstroms and the distance between the adjacent steps ranges from 0.2 to 3 microns.

9. The method as claimed in claim 1, wherein the ion beams have a flow speed of 30 standard cubic centimeter per minute, an energy of 300 eV, a current of 250 mA, and an incidence angle of 65 degrees; the time for etching ranging from 20 seconds to 200 seconds.

10. A method for forming a slider having micro-texture, the method comprising:

positioning sliders arranged in arrays on a tray, each slider having a pole tip facing upward;

loading the tray into a processing chamber, and evacuating the processing chamber to a preset pressure;

introducing a mixture gas of inert gas and hydrocarbon gas into the processing chamber, and ionizing the mixture gas to form ion beams, wherein the mixture gas contains Argon and ethylene, and the content of the ethylene is 10 percent;

exposing the sliders to the ion beams for etching so as to form micro-texture with two-step structure on the air bearing surface of the sliders;

forming a silicon coating on the surface having the micro-texture; and forming a diamond-like carbon layer on the silicon coating.

11. The method as claimed in claim 10, wherein the content of the ethylene is 20 percent.

12. The method as claimed in claim 10, wherein the content of the ethylene is 40 percent.

13. The method as claimed in claim 10, wherein the ion beams have a flow speed of 30 sccm, an energy of 300 eV, a current of 250 mA, and an incidence angle of 65 degrees; the time for etching ranging from 20 seconds to 200 seconds.

14. A method for forming micro-texture on air bearing surface of a slider, the method comprising:

positioning sliders arranged in arrays on a tray, each slider having a pole tip facing upward;

loading the tray into a processing chamber, and evacuating the processing chamber to a preset pressure;

introducing a mixture gas of inert gas and hydrocarbon gas into the processing chamber, and ionizing the mixture gas to form ion beams;

exposing the sliders to the ion beams for etching so as to form micro-texture with two-step structure on the air bearing surface of the sliders, wherein the ion beams have a flow speed of 30 standard cubic centimeter per minute, an energy of 300 eV, a current of 250 mA, and an incidence angle of 65 degrees; the time for etching ranging from 20 seconds to 200 seconds.

15. The method as claimed in claim 14, wherein the inert gas is a kind of gas selected from Argon, Neon, Krypton and Xenon.

16. The method as claimed in claim 14, wherein the hydrocarbon gas is a kind of gas selected from methane, ethylene, acetylene and benzenoid gas.

17. A method for forming a slider having micro-texture, the method comprising:
- positioning sliders arranged in arrays on a tray, each slider having a pole tip facing upward;
- loading the tray into a processing chamber, and evacuating the processing chamber to a preset pressure;
- introducing a mixture gas of inert gas and hydrocarbon gas into the processing chamber, and ionizing the mixture gas to form ion beams;
- exposing the sliders to the ion beams for etching so as to form micro-texture with two-step structure on the air bearing surface of the sliders;
- forming a silicon coating on the surface having the micro-texture; and
- forming a diamond-like carbon layer on the silicon coating,
- wherein the ion beams have a flow speed of 30 sccm, an energy of 300 eV, a current of 250 mA, and an incidence angle of 65 degrees; the time for etching ranging from 20 seconds to 200 seconds.

18. The method as claimed in claim 17, wherein the inert gas is a kind of gas selected from Argon, Neon, Krypton and Xenon.

19. The method as claimed in claim 17, wherein the hydrocarbon gas is a kind of gas selected from methane, ethylene, acetylene, and benzenoid gas.

* * * * *